April 22, 1969  G. G. WARD  3,439,748

PLOW TRIP

Filed Oct. 25, 1966  Sheet __1__ of 3

INVENTOR
GERALD G. WARD
ATT'Y

April 22, 1969

G. G. WARD 3,439,748

PLOW TRIP

Filed Oct. 25, 1966

INVENTOR
GERALD G. WARD

ATT'Y

April 22, 1969   G. G. WARD   3,439,748
PLOW TRIP
Filed Oct. 25, 1966   Sheet 3 of 3
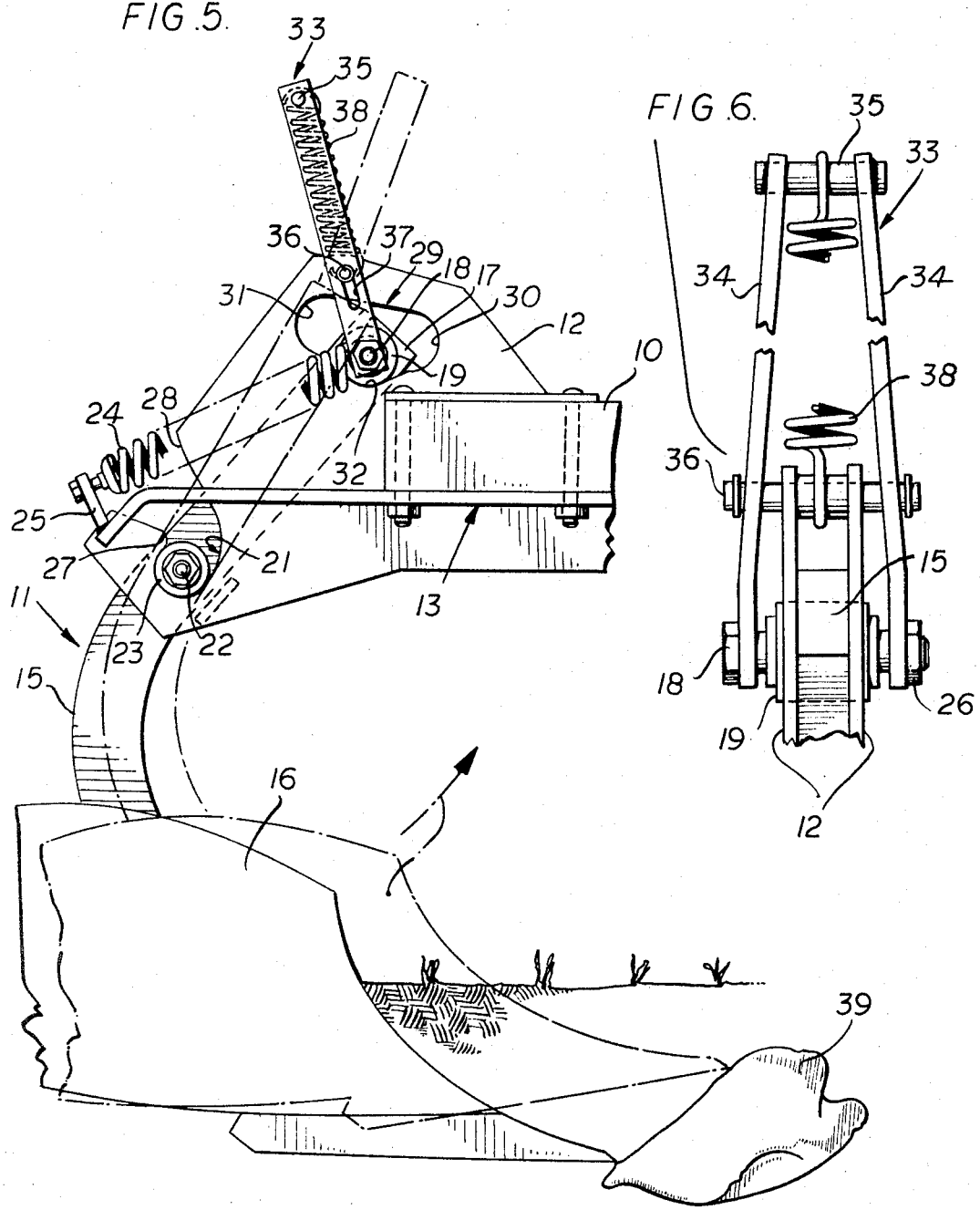
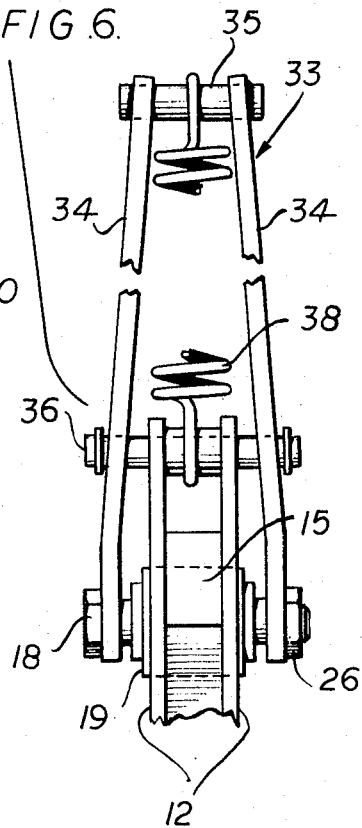
INVENTOR
GERALD G. WARD
ATT'Y 3,439,748
PLOW TRIP
Gerald G. Ward, Naperville, Ill., assignor to International Harvester Company, Chicago, Ill., a corporation of Delaware
Filed Oct. 25, 1966, Ser. No. 589,252
Int. Cl. A01b 61/04
U.S. Cl. 172—269            3 Claims

ABSTRACT OF THE DISCLOSURE

A plow-carrying standard is mounted on its supporting frame by lost motion connections permitting forward movement of the upper portion of the plow standard against the action of a spring, one of the connections being releasable upon said forward movement to accommodate tripping of the plow.

---

This invention relates to earth-working implements and particularly to plows. More specifically, the invention concerns a novel plow trip.

An object of the invention is the provision of novel means for mounting an earth-working tool on a supporting frame to accommodate tripping of the plow unit when abnormal draft conditions are encountered.

Another object of the invention is the provision of novel trip mechanism for a plow wherein draft forces acting on the plow are directed forwardly and upwardly against the supporting standard and the frame, and wherein lost motion in the connnections of the standard to the frame accommodate forward movement of the upper end of the plow standard prior to tripping.

Other objects and advantages of the invention will become clear from the following detailed description when read in conjunction with the accompanying drawings wherein:

FIGURE 5 is a modification of the structure shown in FIGURES 1 to 4; and

FIGURE 6 is an enlarged front elevation of a portion of the structure shown in FIGURE 5.

Figure 1:
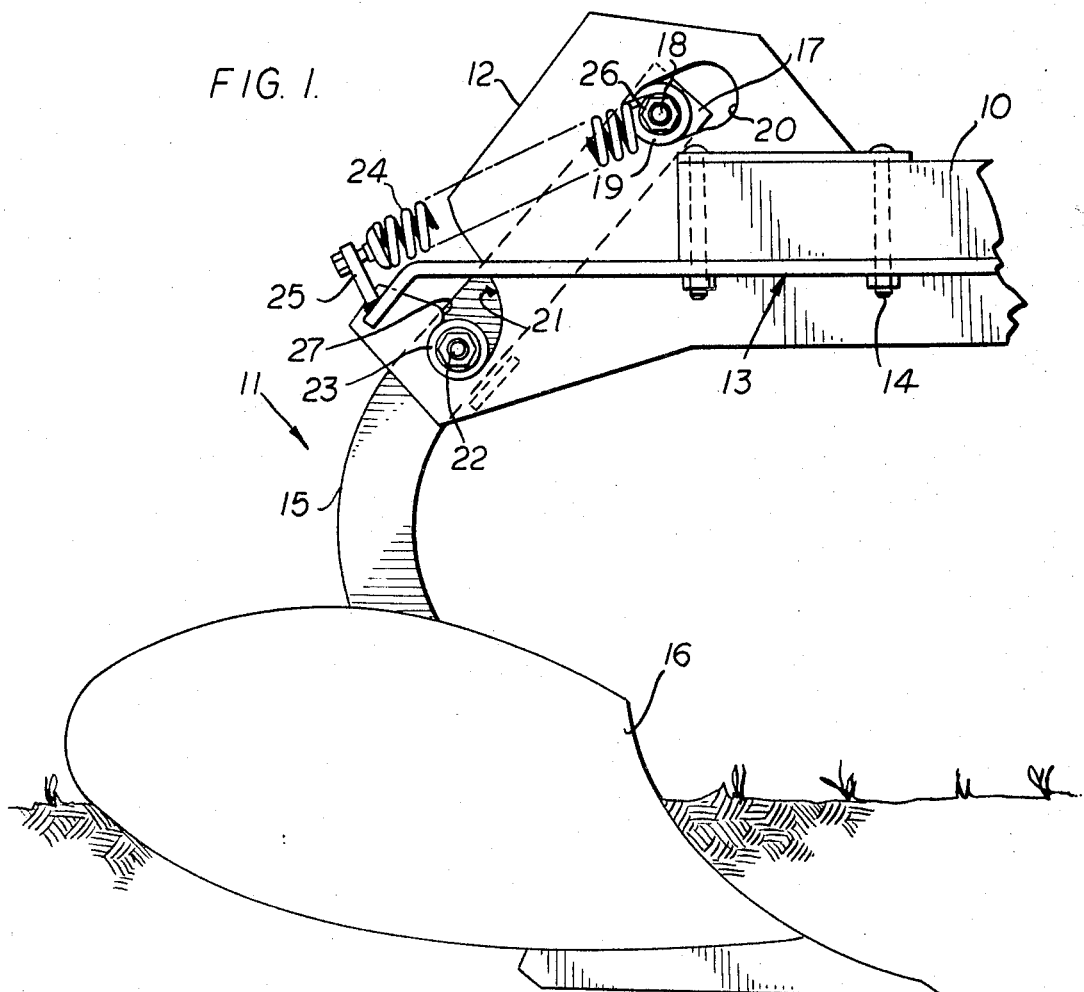
FIGURE 1 is a view in side elevation of a portion of a moldboard plow showing a plow unit in the operating position and mounted on a supporting frame by trip mechanism incorporating the features of this invention.
Figure 2:
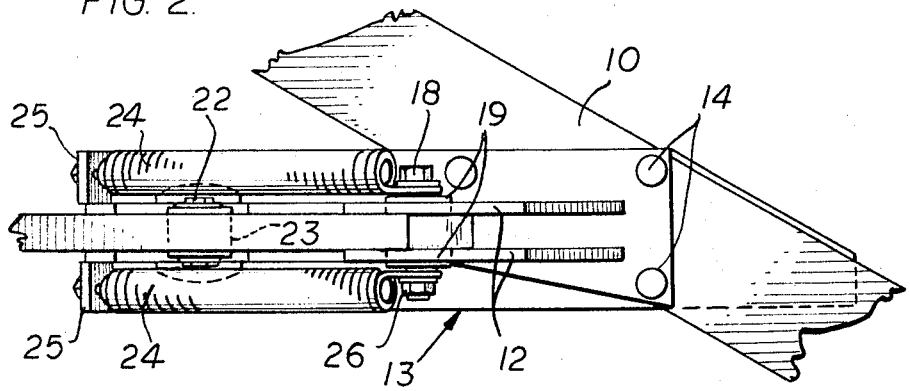
FIGURE 2 is a plan view of a portion of the structure shown in FIGURE 1.

In the drawings the numeral 10 designates the diagonally extending backbone or supporting frame member for a plurality of plow units, one of which is designated by the numeral 11. A pair of laterally spaced upstanding plates 12 form part of a bracket 13 affixed to the supporting frame member 10 by bolts 14, and mounted between these plates is a tool-carrying standard 15 having a plow bottom 16 mounted on its lower end, and a forwardly directed upper end 17 in which is mounted a pin 18 in the form of a bolt upon which are mounted freely rotatable rollers 19 disposed in upwardly and forwardly directed slots 20 (see FIGURES 1 to 4) in plates 12.

Downwardly and rearwardly from slot 20 a re-entrant recess 21 is formed in each of the plates 12. Pivot means in the form of a bolt 22 is mounted in standard 15 medially of its ends and is surrounded by a sleeve in the form of a freely rotating roller 23 seated in the rearwardly directed end portion 24a of recess 21, in the normal operating position of the plow bottom 16 as shown in FIGURE 1. In this position rollers 19 also substantially engage the rear end of slots 20.

When the plow unit 11 is in the operating position of FIGURE 1 and plow bottom 16 encounters an abnormal draft force such as an obstruction exerting a force rearwardly against the bottom, this force is directed upwardly and forwardly along the curved standard 15 tending to move rollers 19 forwardly in slots 20 and roller 23 forwardly in recess 21. This movement is resisted and the plow unit is held to its operating position under normal draft conditions by the provision of a pair of laterally spaced springs 24, one end of each spring being anchored to a lug 25 secured to the rear end of bracket 13 and to opposite ends of bolt 18, the parts being held in position on bolt 18 by a nut 26.

Figure 3:
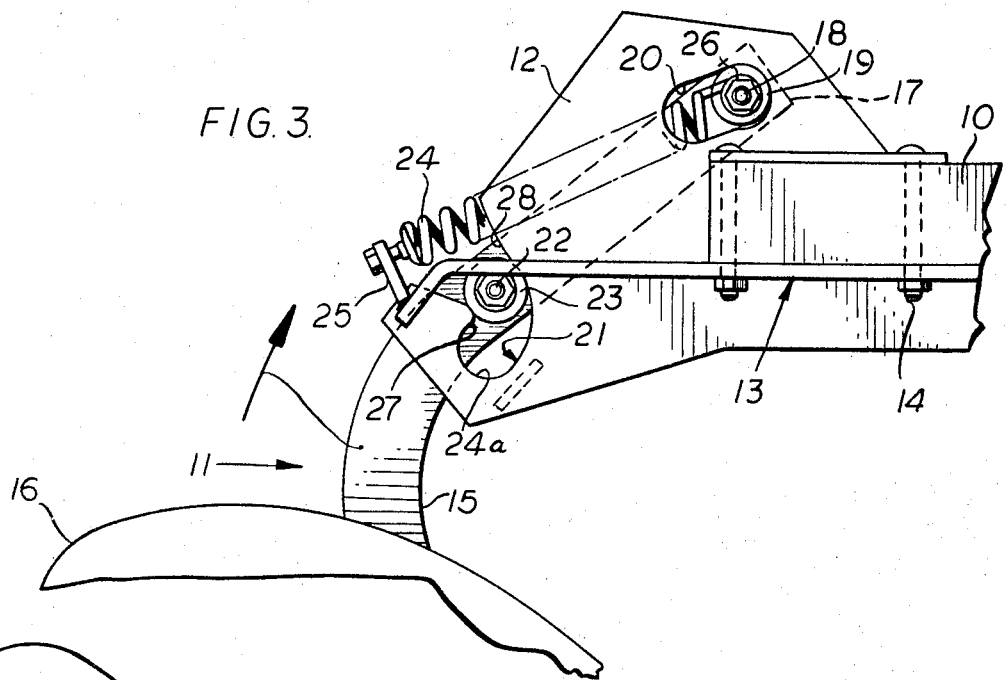
FIGURE 3 is a view in side elevation similar to FIGURE 1 showing the position of the parts when the plow unit is released for tripping.
Figure 4:
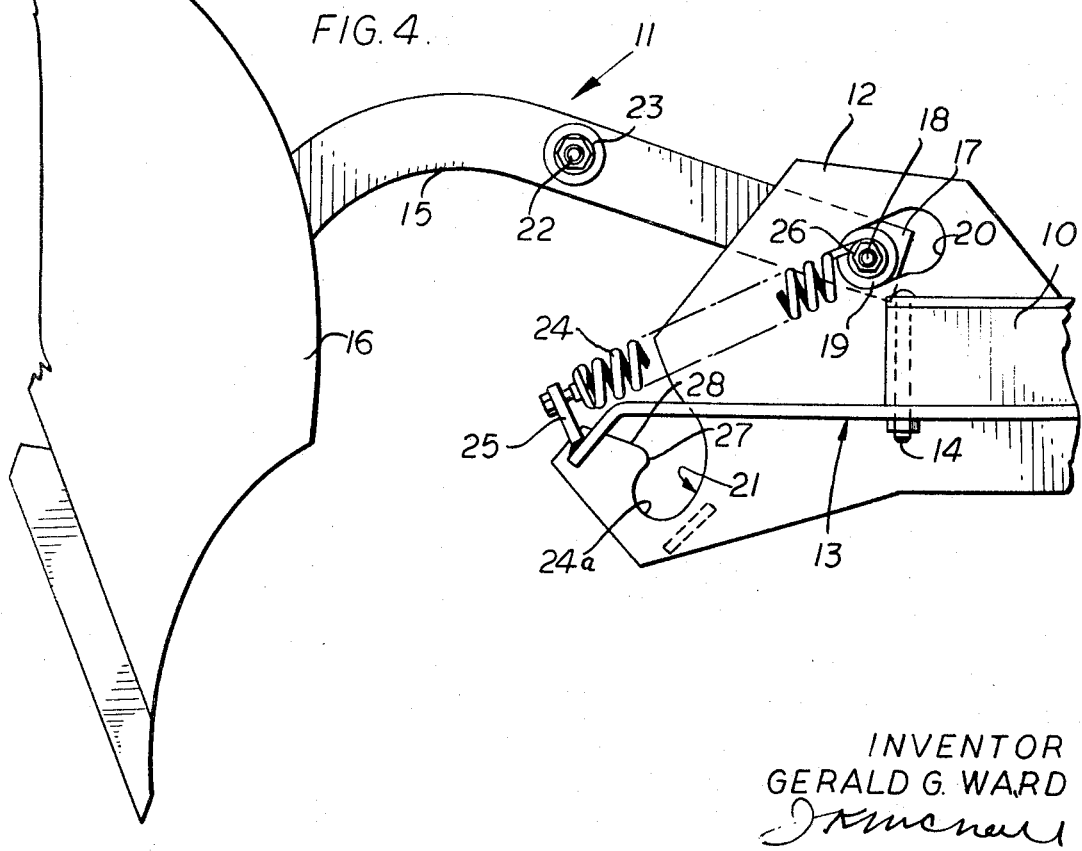
FIGURE 4 is a view similar to FIGURES 1 and 3 showing the fully tripped position of the plow unit.

When an obstruction is encountered causing abnormal draft force to be directed rearwardly against the plow bottom 16 the force is directed rearwardly and upwardly and bolts 18 and 22 move forwardly in slot 20 and recess 21, respectively, against the action of springs 24. The rolling friction of roller 23 allows it to ride out of the rearwardly directed portion 24a of the recess 21 and to ride over the shoulder 27 as indicated in FIGURE 3 and upwardly through the outwardly flared portion 28 of the recess, generally at right angles to the rearwardly directed portion 24a. The fully tripped position of the plow is shown in FIGURE 4, with the roller 19 on pin 18 being returned by springs 24 to the rear end of slot 20.

The plow of this invention is adapted to be mounted upon a tractor, and upon lifting the implement frame 10 the plow unit returns of its own weight until pivot bolt 22 carrying roller 23 is again received in recess 21.

By providing for forward movement of the forward upper end of plow supporting standard 15, improved tripping action results from swinging of the plow unit about a virtual pivot point determined by the intersection of lines tangent to radius arcs followed by rollers 19 and 23.

A modified form of the invention described herein is illustrated in FIGURES 5 and 6 wherein like parts are designated by like members, slot 20 in FIGURES 1 to 4 being replaced by a triangularly shaped slot 29 having a forward portion 30 comparable to slot 20 in FIGURES 1 to 4 and a rearwardly directed portion 31, roller 19 being normally seated in the apex 32 of the triangular slot.

A yoke 33 comprises spaced side bars 34 the upper ends of which are secured to a pin 35, and the lower ends of which are mounted upon bolt 18. A pin 36 is carried by plates 12 and is slidable in slots 37 formed in side bars 34. A coil spring 38 is anchored at one end to pin 35 and at its other end to pin 36, and being in tension exerts a force downwardly against pin 18 to hold it in apex 32 of slot 29 in normal operation.

When an obstruction is encountered by the plow bottom 16 such as the rock 39, in the manner indicated in FIGURE 5, so that a ground force is directed vertically upwardly against the plow point, damage to the plow point is prevented by the up relief accommodated by yoke 33 with spring 38 and the rear portion 31 of slot 29. When the plow bottom moves to the dotted line position of FIGURE 5, roller 19 moves rearwardly and upwardly, the plow units swinging about roller 23 as a pivot until the obstruction is passed.

It is believed that the construction and operation of the novel plow trip mounting of this invention will be clearly understood from the foregoing description.

What is claimed is:

1. In trip plows and the like, a supporting frame member, a standard member carrying an earth-working tool at its lower end, pivot means carried by one of said members and a recess formed in the other of said members having a rearwardly directed portion to receive said pivot means, during normal operation of the plow, at a location medially of the ends of said standard member to accommodate movement of the latter relative to the frame, said recess having a forward upwardly directed portion through which said pivot means is released, pin means carried by one of said members and a slot formed in the other of said members to slidably receive said pin means to form a connection between the upper portion of said standard and the frame accommodating forward movement of the upper portion of the standard relative to the frame in response to draft forces acting on the tool, said pivot means being releasable from said recess upon said forward movement of the upper portion of said standard to accommodate tripping of said standard and tool.

2. The invention set forth in claim 1, wherein yieldable means is operatively connected between the frame and said standard to resist tripping of said standard and tool.

3. The invention set forth in claim 2, wherein said slot includes an abutment rearwardly of the forward end thereof engageable by said pin means in the normal operating position of the tool and said slot has a generally rearwardly directed component to accommodate movement of said pin means generally rearwardly in an arc about the pivot axis of said pivot means in response to a draft force directed upwardly against said tool.

References Cited
UNITED STATES PATENTS 3,191,688  6/1965   Morkoski et al. _____ 172—269
3,292,713  12/1966  Manheim et al. _____ 172—269

ABRAHAM G. STONE, *Primary Examiner.*

STEPHEN C. PELLEGRINO, *Assistant Examiner.*